US009424297B2

(12) United States Patent
Golod et al.

(10) Patent No.: US 9,424,297 B2
(45) Date of Patent: Aug. 23, 2016

(54) INDEX BUILDING CONCURRENT WITH TABLE MODIFICATIONS AND SUPPORTING LONG VALUES

(71) Applicants: Daniil Golod, Toronto (CA); Peter Bumbulis, Kitchener (CA); John Smirnios, Kitchener (CA); Anil Kumar Goel, Kitchener (CA)

(72) Inventors: Daniil Golod, Toronto (CA); Peter Bumbulis, Kitchener (CA); John Smirnios, Kitchener (CA); Anil Kumar Goel, Kitchener (CA)

(73) Assignee: Sybase, Inc., Dublin, CA (US)

( * ) Notice: Subject to any disclaimer, the term of this patent is extended or adjusted under 35 U.S.C. 154(b) by 204 days.

(21) Appl. No.: 14/049,608

(22) Filed: Oct. 9, 2013

(65) Prior Publication Data

US 2015/0100557 A1    Apr. 9, 2015

(51) Int. Cl.
*G06F 17/00* (2006.01)
*G06F 7/00* (2006.01)
*G06F 17/30* (2006.01)

(52) U.S. Cl.
CPC .... *G06F 17/30336* (2013.01); *G06F 17/30362* (2013.01); *G06F 17/30495* (2013.01)

(58) Field of Classification Search
CPC ................ G06F 17/30336; G06F 17/30362; G06F 17/30495
USPC ........................................................ 707/696
See application file for complete search history.

(56) References Cited

U.S. PATENT DOCUMENTS

| | | | | |
|---|---|---|---|---|
| 5,347,653 | A * | 9/1994 | Flynn ............... | G06F 17/30309 707/695 |
| 5,488,717 | A * | 1/1996 | Gibson ............. | G06F 17/30625 341/55 |
| 5,594,898 | A * | 1/1997 | Dalal ............... | G06F 17/30321 707/696 |
| 5,745,904 | A * | 4/1998 | King ................ | G06F 17/30321 707/696 |
| 5,918,225 | A | 6/1999 | White et al. | |
| 6,101,491 | A * | 8/2000 | Woods ............. | G06F 17/30011 707/696 |
| 6,279,004 | B1 * | 8/2001 | Lee .................. | G06F 17/30309 707/695 |
| 6,438,562 | B1 * | 8/2002 | Gupta .............. | G06F 17/30336 707/696 |
| 6,460,047 | B1 | 10/2002 | Ambroziak | |
| 6,578,026 | B1 * | 6/2003 | Cranston .......... | G06F 17/30327 707/696 |
| 6,694,323 | B2 | 2/2004 | Bumbulis | |
| 6,968,348 | B1 * | 11/2005 | Carone ............ | G06Q 40/02 707/696 |
| 7,149,748 | B1 | 12/2006 | Stephan | |
| 7,181,481 | B2 | 2/2007 | Chen et al. | |

(Continued)

*Primary Examiner* — Pavan Mamillapalli
(74) *Attorney, Agent, or Firm* — Sterne, Kessler, Goldstein & Fox P.L.L.C.

(57) ABSTRACT

Disclosed herein are system, method, and computer program product embodiments for constructing an index for a database table. An index that comprises a data structure may be created. The index can then be populated with data from the database table. When a request to modify the database table is received, the method may determine that the request to modify the database table relates to a portion of the database table corresponding to a portion of the index that has yet to be populated. An entry indicating the requested modification can be inserted into the portion of the index that has yet to be populated.

23 Claims, 14 Drawing Sheets

(56) References Cited

U.S. PATENT DOCUMENTS

| | | | |
|---|---|---|---|
| 7,185,019 B2* | 2/2007 | Nayak | G06F 17/30622 707/690 |
| 7,308,456 B2* | 12/2007 | Friske | G06F 17/30368 707/999.102 |
| 7,406,477 B2 | 7/2008 | Farrar et al. | |
| 7,680,764 B2 | 3/2010 | Chandrasekar et al. | |
| 7,827,160 B2 | 11/2010 | Kuhr et al. | |
| 8,195,702 B2* | 6/2012 | Shankar et al. | 707/796 |
| 8,200,673 B2 | 6/2012 | Hanson et al. | |
| 8,510,281 B2* | 8/2013 | Schwarzmann | G06F 17/30362 707/704 |
| 2006/0106849 A1* | 5/2006 | Pelletier | G06F 17/30336 707/999.101 |
| 2008/0263007 A1 | 10/2008 | Schmidt | |
| 2009/0037366 A1* | 2/2009 | Shankar et al. | 707/2 |
| 2009/0265306 A1 | 10/2009 | Barsness et al. | |
| 2010/0161569 A1 | 6/2010 | Schreter | |

* cited by examiner

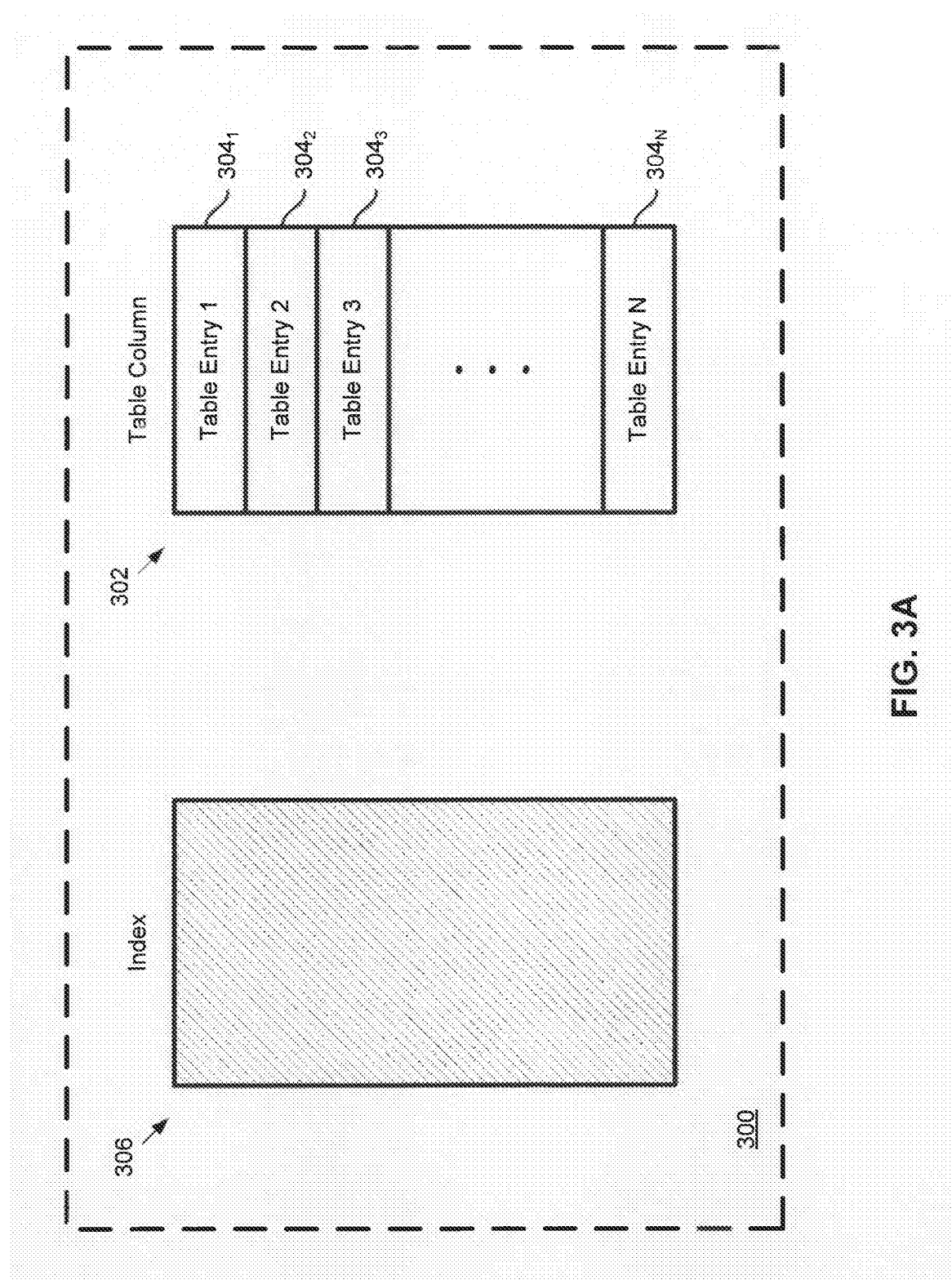

INDEX BUILDING CONCURRENT WITH TABLE MODIFICATIONS AND SUPPORTING LONG VALUES

BACKGROUND

Databases typically store data in a number of data structures such as database tables. Retrieving data from such database tables involves querying the table to find the correct row and returning the correct data. Simply traversing the table rows until the correct one is identified, however, can be a rather time consuming and processor-intensive prospect. The average number of rows that would have to be searched to find the correct row of the table equals (n+1)/2 wherein n is the number of rows. Thus, for a table having, say, 100 rows, an average of 50.5 rows must be examined before the correct row is reached. In some cases many more than the average number of rows must be examined. For instance, in the extreme case, the maximum number of rows that must be examined in order to find the correct row is equal to the actual number of rows, n. Querying a table by stepping through each of the rows in order, therefore, results in unacceptable latency for tables that are frequently queried or for tables that are exceptionally large.

To combat this latency issue, large and/or frequently accessed tables can be indexed. Indexing is a way of copying certain information contained in the table and ordering it in such a way that facilitates faster searching of the table. While this comes at the cost of requiring additional data storage facility and additional write operations, it can greatly decrease the time required to find data in a database table. By way of example, a column of the table could be indexed by organizing the elements in each row in a known order (e.g., ascending or descending values) or in a particular data structure (e.g., a b-tree). Such indexing can greatly increase the speed with which the correct row is identified. For instance, for an ordered index, the average number of rows that must be examined is $\log_2(n)-1$ and the maximum number of rows that must be examined is $\log_2(n)$ rows. Thus, by simply creating an index that orders the 100-row table discussed above and performing a binary search using the index has the effect the average number of rows that must be examined can be decreased significantly from 50.5 to $\log_2(100)$=6.64. Indexing is, therefore, be a powerful tool to reduce latency in database queries.

The creation of an index for database table or a column of a database table, however, is sometimes no small feat. For instance, in a large database (e.g., of the type frequently used in modern commercial applications), such an index can take many hours to create. To ensure that the index is accurate the table being indexed must typically be locked to writers during the creation of the index, which necessitates making the database or database table unavailable to some client applications or customers during that time. However, lengthy downtimes are less and less acceptable. Accordingly, it would be desirable to be able to create an index such that the time that the database table is unavailable is minimized.

BRIEF DESCRIPTION OF THE DRAWINGS

The accompanying drawings are incorporated herein and form a part of the specification.

FIGS. 3A-3F depict a database index at various points during its creation according to various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, that embody new and inventive ways of indexing a database according to various embodiments.

For instance, according to one embodiment, a method of constructing an index for a database table is provided. The method involves creating an index that comprises a data structure. The index can then be populated with data from the database table. When a request to modify the database table is received, the method may determine that the request to modify the database table relates to a portion of the database table corresponding to a portion of the index that has yet to be populated. An entry indicating the requested modification can be inserted into the portion of the index that has yet to be populated.

According to another embodiment, a database system may comprise a data storage and a database management entity. The database storage may include at least one database table. Additionally, the database management entity may be configured to create an index that comprises a data structure. The database management entity may also be configured to populate the index with data from the database table and to receive a request to modify the database table. Upon receiving the request to modify the database table, the database management entity may be configured to determine that the request to modify the database table relates to a portion of the database table corresponding to a portion of the index that has yet to be populated. Furthermore, the database management entity may also be configured to insert an entry indicating the requested modification into the portion of the index that has yet to be populated.

These various embodiments and others will now be described with respect to FIGS. 1-8.

Figure 1:
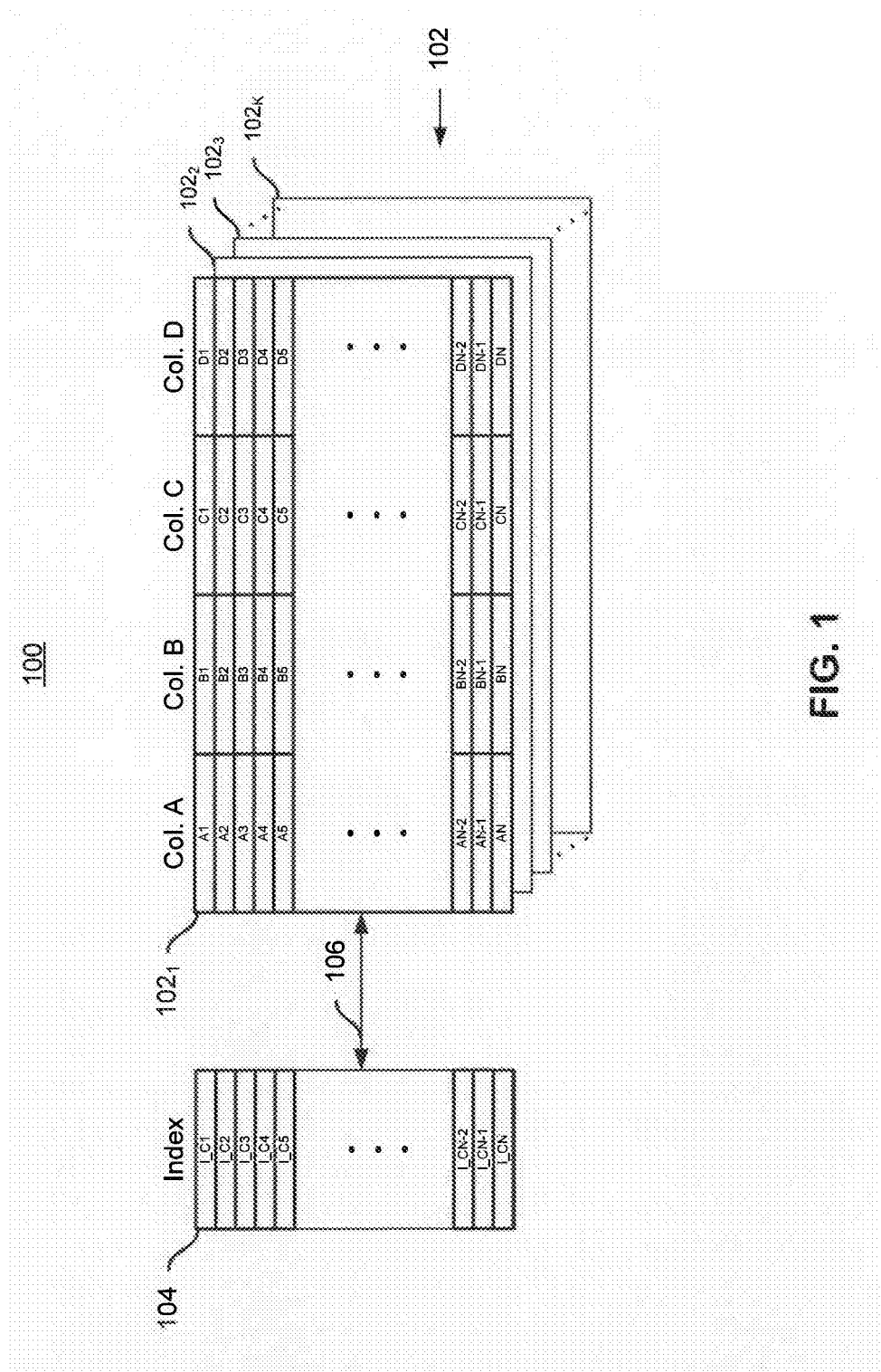
FIG. 1 is functional representation of data in a database according to various embodiments.

FIG. 1 is a depiction of data 100 in a database according to various embodiments. The data 100 includes one or more database tables $102_1$ to $102_K$ (collectively database tables 102) and an index 104 associated with, in this case, database table $102_1$ via logical connection 106. As depicted in FIG. 1, database table $102_1$ has columns A to D and rows 1 to N. However, it should be understood that database table $102_1$ may have any number of columns and rows within the scope and spirit of this disclosure. Furthermore, each of the other database tables (i.e., database tables $102_2$ to $102_K$) may have any number of columns and rows and the number of columns and rows may vary from table to table.

Index 104 is depicted as being associated with database table $102_1$ in FIG. 1. To that end, index 104 may contain entries that correspond to the data in one or more columns of database table $102_1$. For instance, index 104 might comprise an index of the data in column C of database table $102_1$. Additionally, according to various embodiments, the index entries (i.e., I_C1 to I_CN) can be ordered, clustered, arranged in a b-tree, or arranged in any other way that allows fast location of the entries.

While FIG. 1 only shows index 104, several indexes may be associated with each of the database tables 102. For instance, with respect to database table $102_1$, each of the columns could have one or more indexes associated with it. Additionally, each index 104 may be associated with one or more columns according to various embodiments.

Figure 2A:
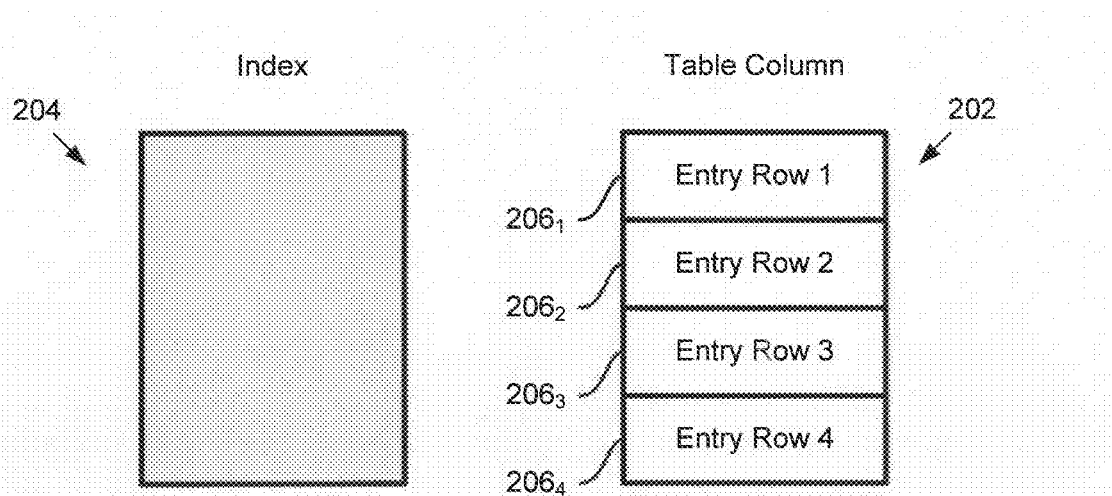
FIGS. 2A-2C depict the creation of a database index according to various embodiments.
Figure 2B:
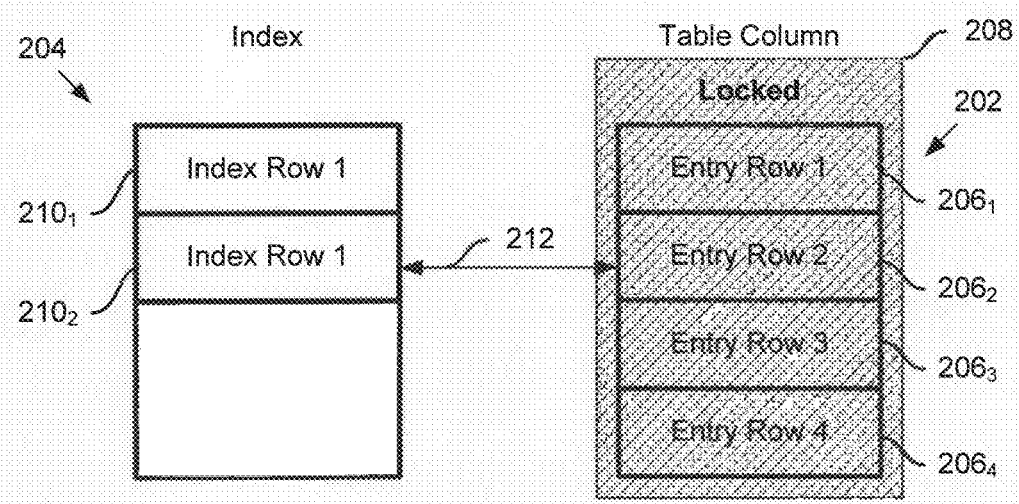
Figure 2C:
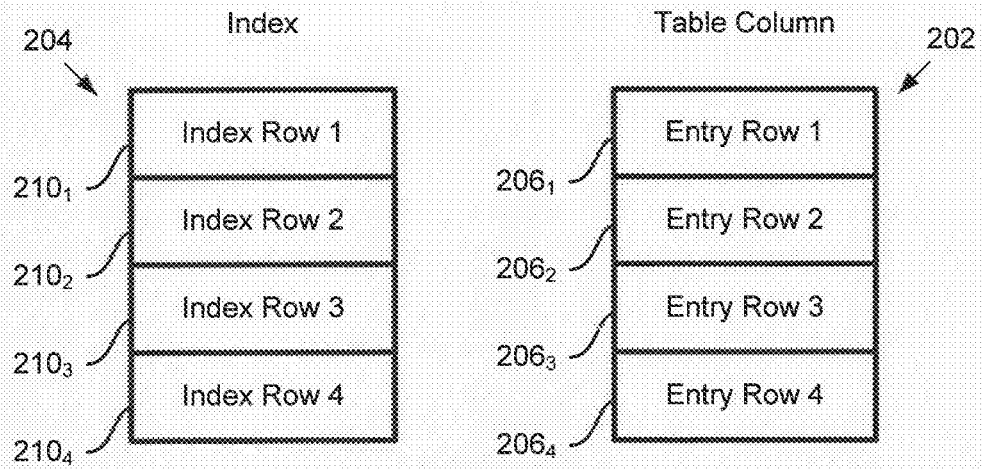

FIGS. 2A-2C depict the creation of an index 204 corresponding to a table 202 according to various embodiments. The method depicted in FIGS. 2A-2C could be used to create an index (e.g., index 104) for any number of different database tables (e.g., database tables 102), however, for ease of explanation, the figures depict a simplified table column 202 and four entry rows $206_1$ to $206_4$ (collectively entry rows 206) and a single entry in each row.

As shown in FIG. 2A, in order to index table column 202, an empty index 204 is created. The index may comprise any number of appropriate data structures such as tables, trees, arrays, lists, etc. However, according to embodiments, the index 204 must be able to accommodate each of the rows in table column 202. That is, in these embodiments, the index 204 must be capable of having at least as many entries as table column 202 has rows.

In FIG. 2B, a lock 208 has been placed on table column 202. In practice, this lock may extend to the entire table or, indeed, even to an entire database depending on how the database is arranged. At this stage, an entity, such as a database management entity 212 may scan each of the rows 206 of table column 202 and populate the index 204 with corresponding entries. For instance, as shown in FIG. 2B, the database management entity has scanned Entry Row 1 $206_1$ from the table column 202 and created a corresponding Index Row 1 $210_1$ in index 204. Additionally, the database management entity 212 has scanned Entry Row 2 $206_2$ from the table column 202 and created a corresponding Index Row 2 $210_2$ in index 204. In this manner, the database management entity may scan each of the rows 206 of the table column 202 and create corresponding index rows 210 in the index 204.

FIG. 2C depicts the index 204 and the table column 202 after the lock 208 has been removed from the table column 202. As can be seen, the lock 208 is removed once the database management entity 212 has completed scanning each of the rows in table column 202 and created corresponding entries 210 in index 204. Because the database management entity 212 must go through each of the rows 206 of the table column 202, the time it takes to populate the index 204 with entries 210 depends directly on the number of rows 206 the table column 202 has. Furthermore, because the lock 208 must remain on the table column 202 until the index 204 is populated, the time that the lock 208 must remain on the table column 202 is also directly dependent on the number of rows 206 the table column has. However, in cases where the table column 202 is very long, the task of populating the index 204 with entries 210 can take quite a long time, which would necessitate leaving the lock on table a long time—many hours in some cases. Leaving the lock 208 on the table column 202, however, can have serious and negative impacts on the ability of the database to function since the lock prevents modification to the database requiring, in some instances, the database to be taken offline. To many database users, such a long period of inability to modify a database table is unacceptable. It is, therefore, desirable to allow the creation of an index without having to lock the table for very long.

Figure 3B:
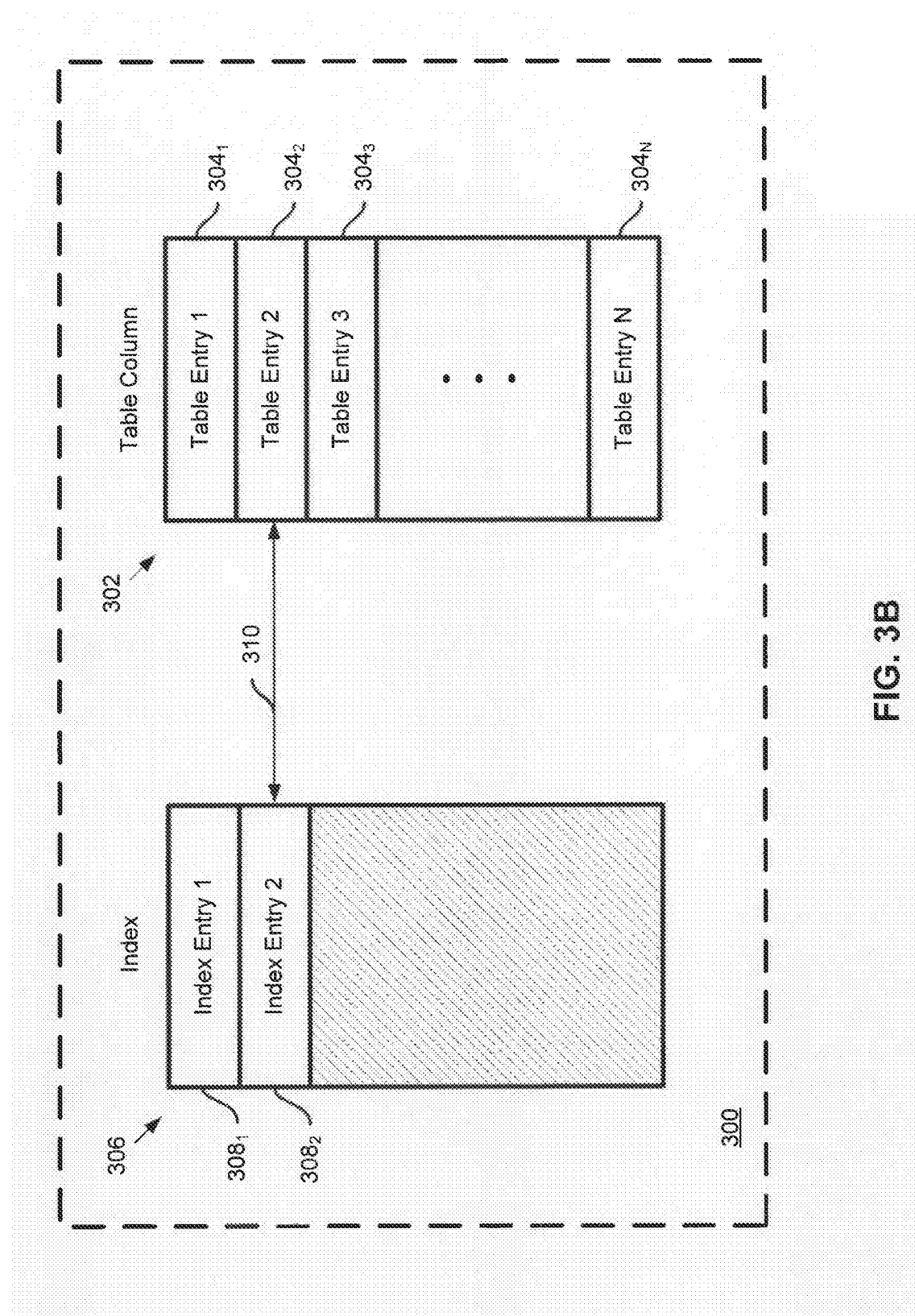

FIGS. 3A-3F depict database data 300 during the creation and population of an index 306 according to a process that does not necessarily require locking of the database table column 302. As shown in FIG. 3A, database data 300 may contain a table column 302 containing a number of entries $304_1$ to $304_N$ (collectively entries 304). FIGS. 3A-3F depict a single table column 302 for simplicity of explanation, but it should be understood that this could be equally described with respect to one or more multi-columned tables (e.g., any of tables 102) and still be within the spirit and scope of this disclosure.

Similarly to what was depicted in FIG. 2A, an empty index 306 is created that corresponds to the table column 302. As stated above, index 306 may comprise any number of appropriate data structures such as tables, trees, arrays, lists, etc. However, according to embodiments, the index 306 must be able to accommodate each of the rows in table column 302. That is, in these embodiments, the index 306 must be capable of having at least as many entries as table column 302 has rows. Additionally, it should be noted that prior to creating the index, the table column 302 may be briefly locked to allow uncommitted operations (e.g., add/delete row operations) to resolve themselves. This initial lock, however, is brief relative to the time it takes to create and populate an index and is, furthermore, independent of the size of the table column 302.

FIG. 3B depicts the database data 300 after the process of populating the index 306 has begun. Here, a database management entity 310 scans each of the entries 304 of table column 302 and populates the index 306 with corresponding index entries $308_1$ and $308_2$ (all index entries are referred to collectively herein as index entries 308). For instance, as shown in FIG. 3B, the database management entity 310 has scanned Table Entry 1 $304_1$ from the table column 302 and created a corresponding Index Entry 1 $308_1$ in index 306. Additionally, the database management entity 310 has scanned Table Entry 2 $304_2$ from the table column 302 and created a corresponding Index Entry 2 $308_2$ in index 306. According to embodiments, prior to populating the index with an entry corresponding to the table entries 304, the database management entity 310 may first check or determine whether the portion of the index 306 is empty or not. If the corresponding portion of the index 306 is empty, then the database management entity can proceed to create the index entry 308 as discussed above. However, if the portion of the index 306 is not empty, the database management entity may perform no operation at this portion of the index 306 and simply proceed to the next index entry 308 corresponding to the next entry 308 in the table column 302. In this manner, the database management entity 310 may scan each of the table column 302 entries 304 and create corresponding index rows 308 in the index 306.

Figure 3C:
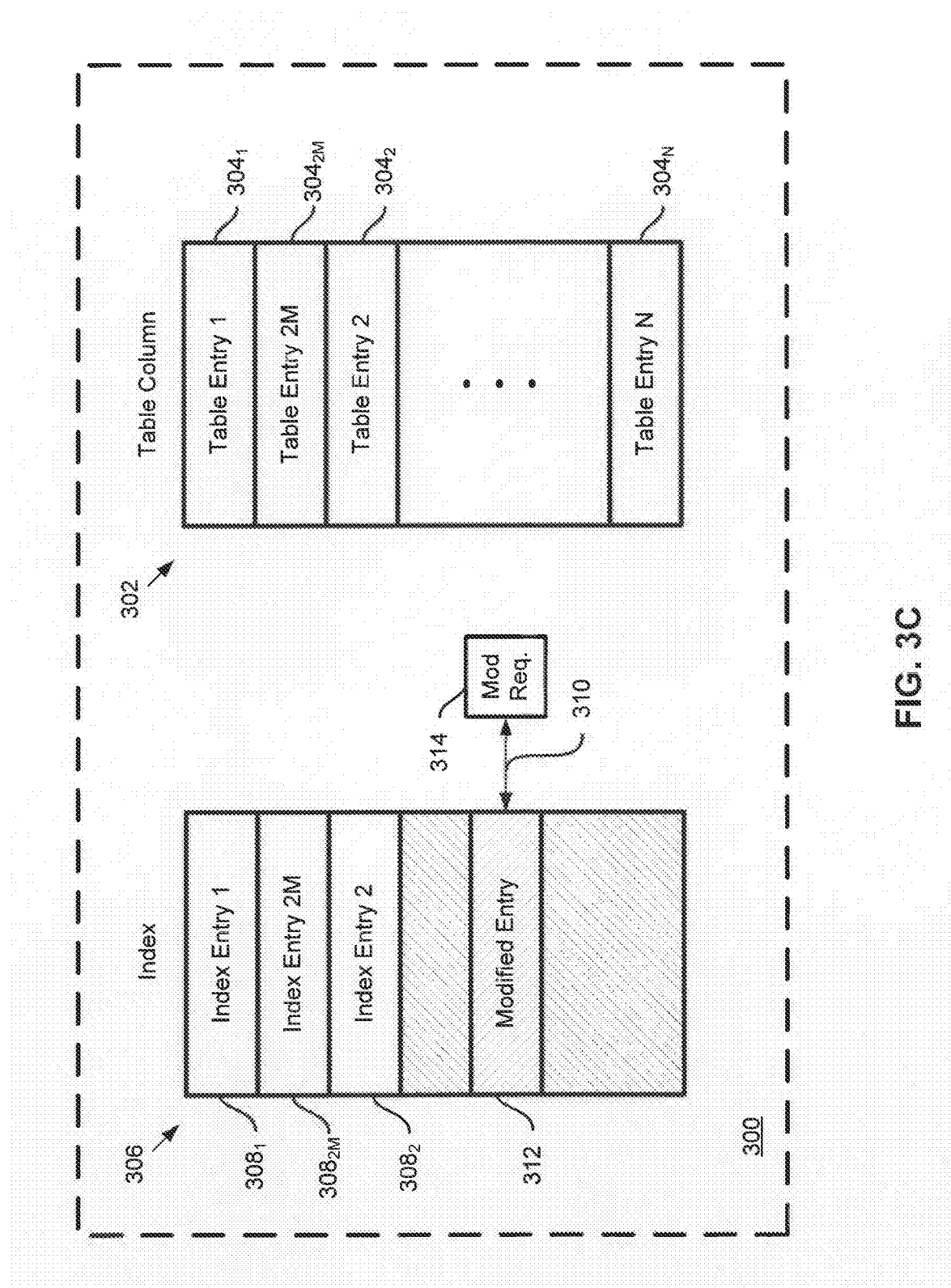

In contrast to the process depicted in FIGS. 2A-2C, the process of populating index 306 depicted in FIGS. 3A-3F does not require that the table column 302 be locked. This can cause a problem in some instance, such as is depicted in FIG. 3C.

FIG. 3C depicts a situation where two modifications to the table column 302 have occurred. In the first instance, a Table Entry 2M $304_{2M}$ was inserted in the table column 302 between Table Entry 1 $304_1$ and Table Entry 2 $304_2$. In this case, because that portion of the index 306 has already been populated, the database management entity 310 can simply handle the modification to the table column 302 using normal table modification handling procedures and insert the corresponding Index Entry 2M $308_{2M}$ in the index 306. After this modification is handled by the database management entity 310, the population of index 306 with data form the table column 302 can resume.

However, an interesting problem occurs when a modification request such a modification request 314 is made with respect to a portion of table column 302 that corresponds to a portion of the index 306 that has yet to be populated. Such an instance is depicted in FIG. 3C. When such a modification request 314 occurs, the management entity must then place an appropriate marker 312 indicating a modified entry in the index 306 at the appropriate location. According to various embodiments, when the modification request constitutes an addition to the table column 302, the marker 312 may comprise the appropriate Index Entry corresponding to the row added to table column 302. However, when the modification for the modification request 314 is a deletion from the table column 302, the database management entity 310 must handle the modification differently because there is not yet anything to delete from the index 306. Accordingly, for deletions from the table column 302, the database management entity inserts a marker 312 that indicates that the corresponding row in the table column 302 has been or will be deleted.

Figure 3D:
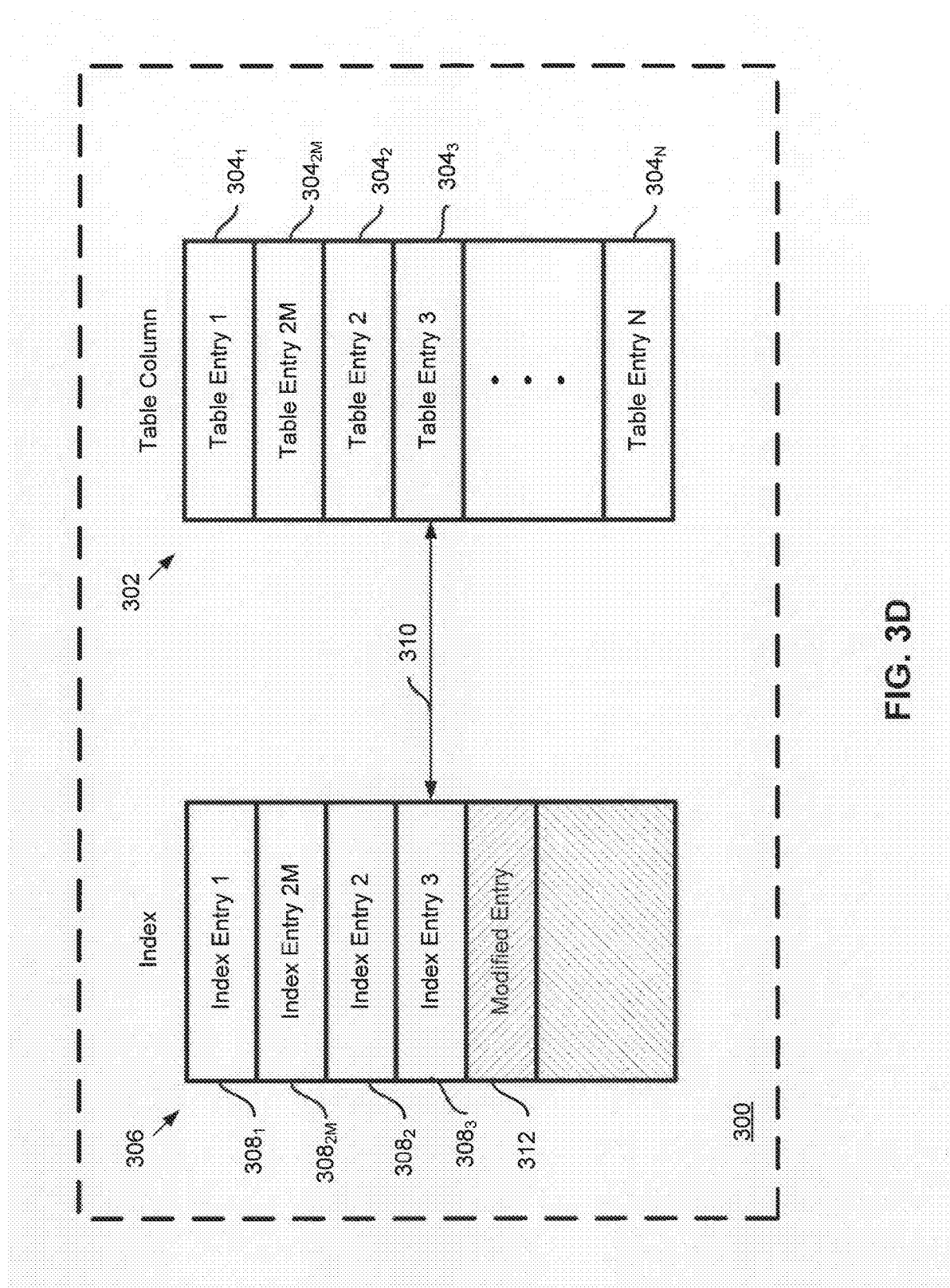
Figure 3E:
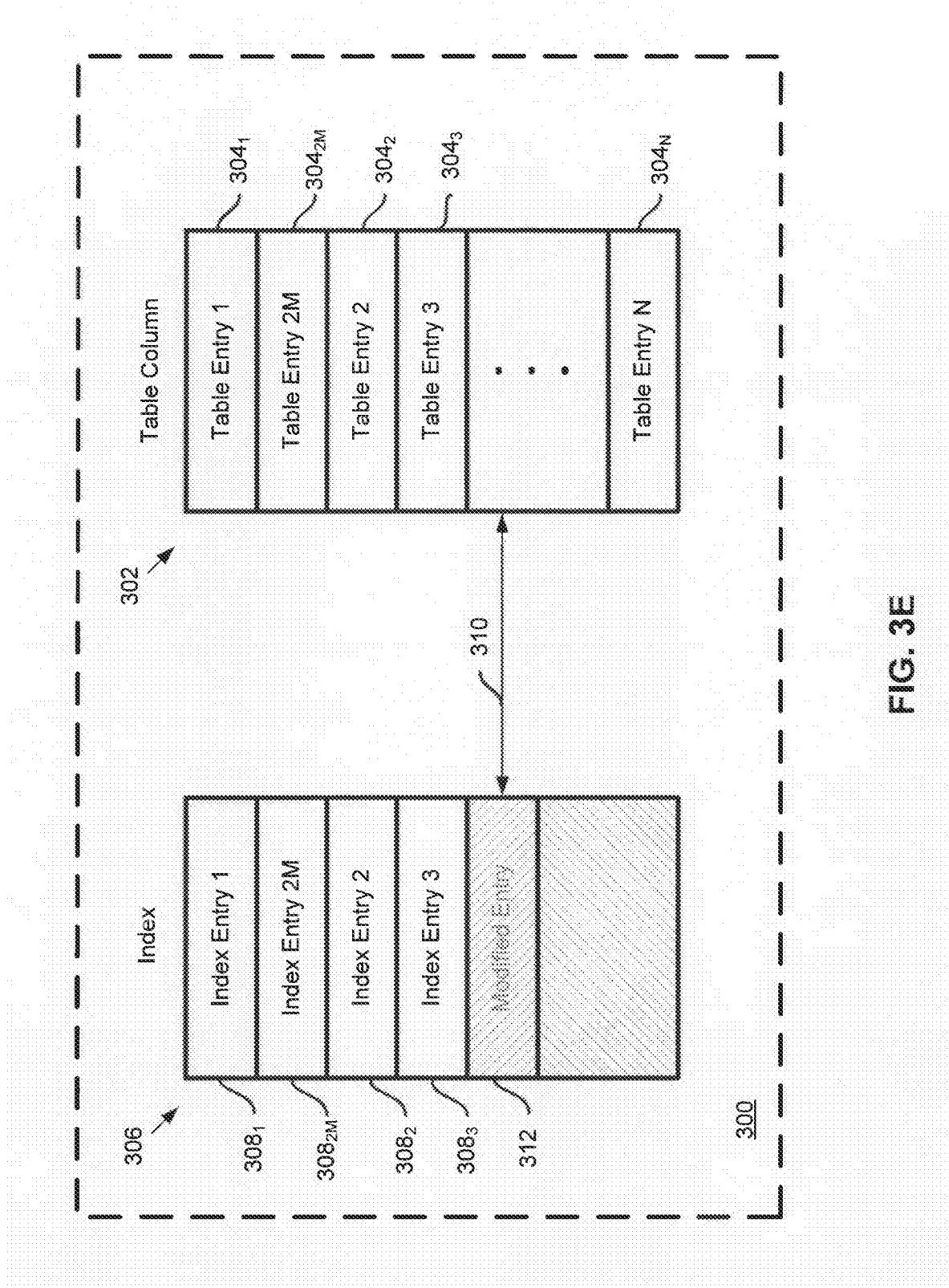
Figure 3F:
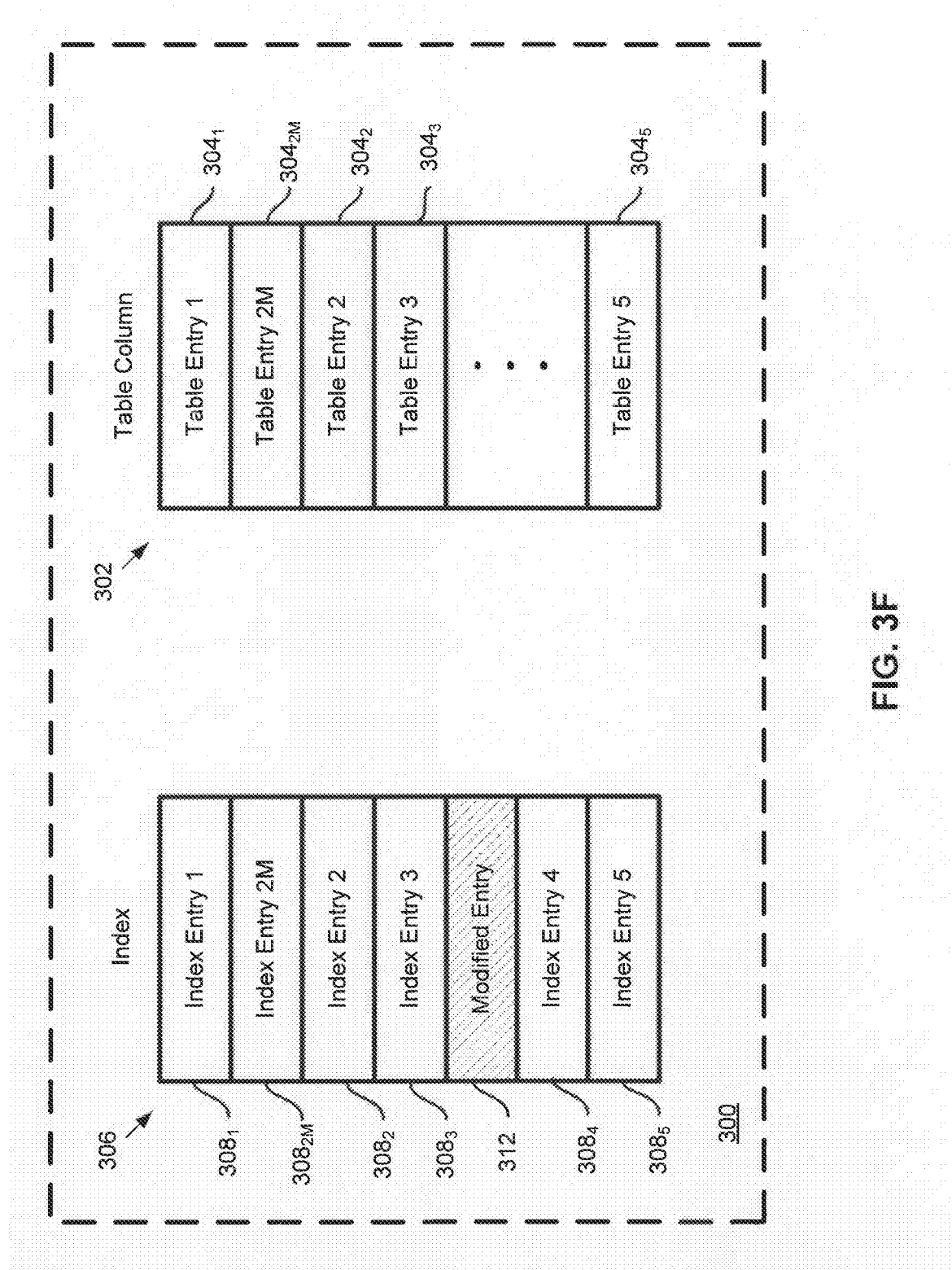

In FIG. 3D, after handling the modification 314 to the table column 302, the database management entity 310 resumes populating the index 306 by inserting an Index Entry 3 $308_3$ corresponding to Table Entry 3 $304_3$. In FIG. 3E, the database management entity 310 has reached a portion of table column 302 that corresponds to the Modified Entry 312. However, since the modification was previously handled already (as depicted in FIG. 3C), it does not need to take an action. Accordingly, the database management entity 310 can take no action with respect to the modified entry 312 and can proceed to the next table entry 304 in the table column 302. In this way, the index 306 may be populated with index entries 308 until each of the table entries 304 in the table column 302 is accounted for in the index 306, as shown in FIG. 3E. Once each of the entries 304 in the table column 302 is accounted for in the index 306, the population of index 306 is complete and the status of the index can be indicated as complete. According to some embodiments, prior to indicating that the status of the index is complete, a lock may be placed on table column 302 in order to allow any uncommitted operations to resolve themselves. This lock, however, is temporary and brief with respect to the amount of time that the creation and population of the index 306 took.

Figure 4:
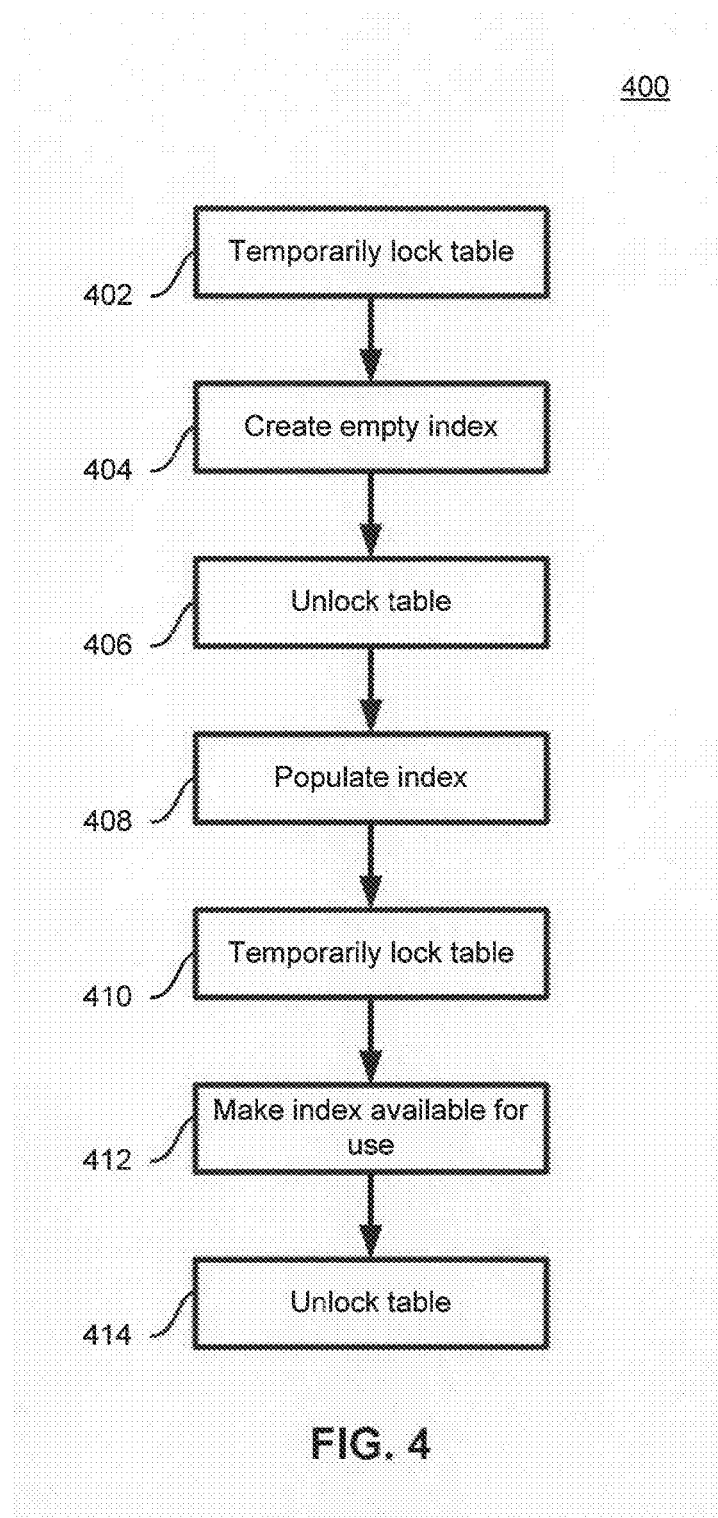
FIG. 4 is a flowchart depicting a method of creating a database index according to various embodiments.

FIG. 4 is a flowchart depicting a high-level process 400 for creating an index 306 for a table or table column 302 according to various embodiments. To aid explanation FIG. 4 will be described with respect to the table column 302 and index 306 depicted in FIGS. 3A-3F, however it should be understood that the process 400 is not limited to these particular embodiments.

As shown in FIG. 4, the process can begin with a temporary lock of the table or table column 302 in step 402. As discussed previously, this initial lock is brief relative to the time it takes to create and populate the index 306 and is independent of the size of the table column 302.

At step 404, an empty index (e.g., index 306) is created to correspond to the table column 302. Index 306 may comprise any number of appropriate data structures such as tables, trees, arrays, lists, etc. However, according to embodiments, the index 306 must be able to accommodate each of the rows in table column 302. That is, in these embodiments, the index 306 must be capable of having at least as many entries as table column 302 has rows. At step 406, the table can be unlocked to allow, e.g., write access to the table for client applications.

At step 408, the index 306 can be populated as described with respect to FIGS. 3A to 3F (and further described with respect to FIGS. 5 and 6, below). During the population of index 306 with entries 308 corresponding to entries 304 of the table column 302, modifications (e.g., modification 314) to the table column 302 can be appropriately reflected in the index 306 with entries that indicate the modification (e.g., entry 312) even when the modification 314 is made with respect to a portion of the table column 302 that corresponds to a portion of the index 306 that has yet to be populated with entries 308.

At step 410, the population of the index 306 is complete and, according to embodiments, the table column 302 can be briefly locked again to facilitate the resolution of uncommitted operations. Again, this lock is temporary and brief with respect to the amount of time that the creation and population of the index 306 took and, furthermore, entirely independent of the length of the table column 302.

At step 412, the index 306 may be made available for general use. This may occur by, for instance, indicating its state as "complete." According to some embodiments, indexes may not be used for querying tables or table columns 302 unless their status is complete. This prevents an incomplete index from being relied on to search a table and possibly yielding incorrect results (e.g., indicating that an entry is not present in the table when, in fact it is). At step 414, the table can be unlocked.

Figure 5:
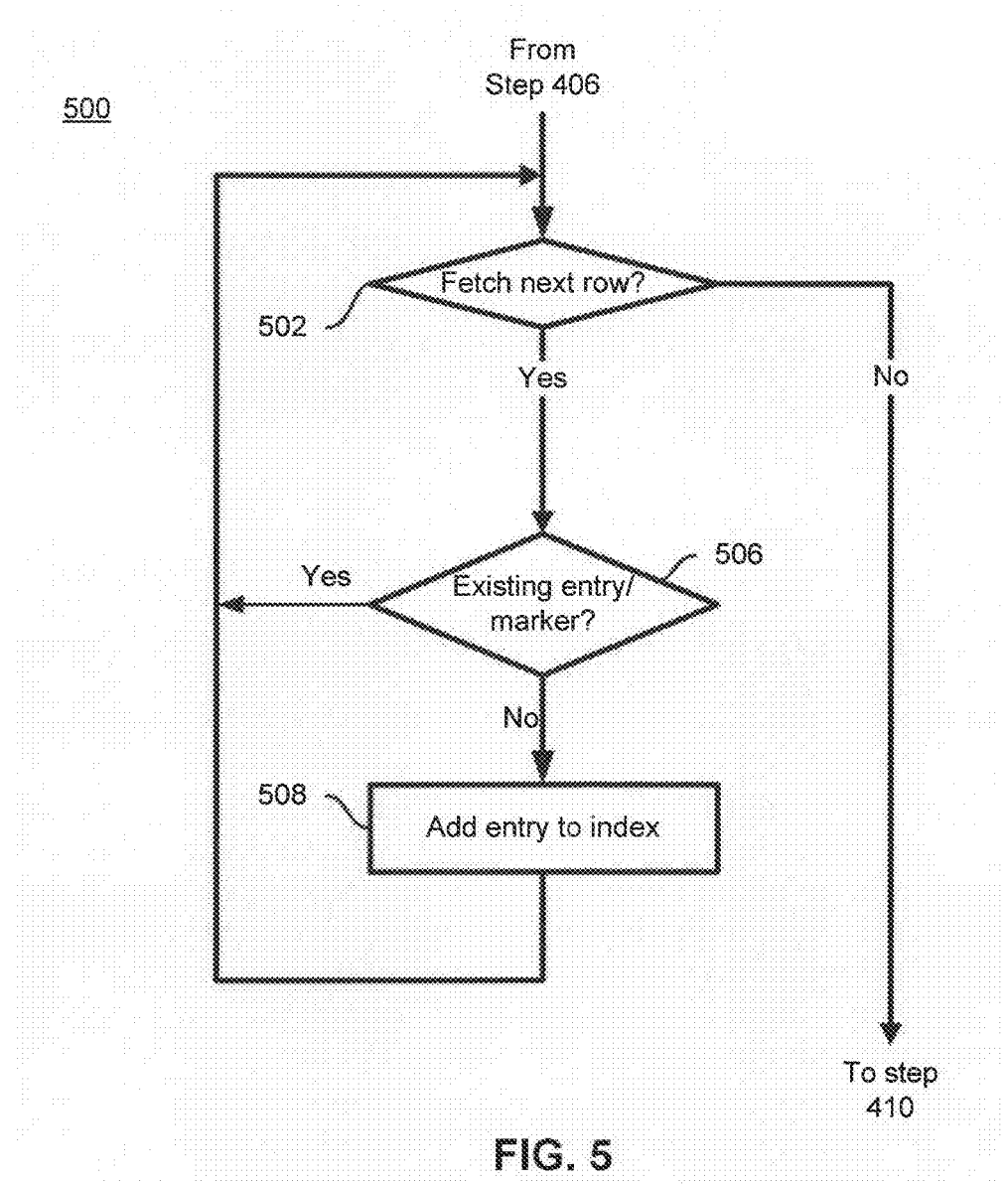
FIG. 5 is a flowchart depicting a method of populating an index according to various embodiments.

FIG. 5 depicts a method 500 of populating an index 306 with index entries 308 corresponding to table entries 304 in a table column 302. As noted above with respect to FIG. 4, to aid in explanation FIG. 5 will be described with respect to the table column 302 and index 306 depicted in FIGS. 3A-3F, however it should be understood that the process 500 is not limited to these particular embodiments.

Method 500 can begin, for instance, after step 406 from FIG. 4 according to some embodiments. At step 502, the method 500 determines whether to fetch the next row of the table 302 for indexing. If it is determined there is no next row to be fetched, then the method can proceed to step 410, for instance. However, if there is a next row to be fetched, then the method 500 proceeds to step 506.

At step 506, the method 500 determines whether there is an existing entry and/or marker in the index 306 associated with the row fetched from table 302. If there is an associated existing entry and/or marker (e.g., marker 312), then the method does not need to perform an operation for that row and can loop back to step 502. However, if there is no associated entry or marker 312, then the method 500 can add the required entry at step 508. After performing step 508, the method 500 loops back to step 502

Figure 6A:
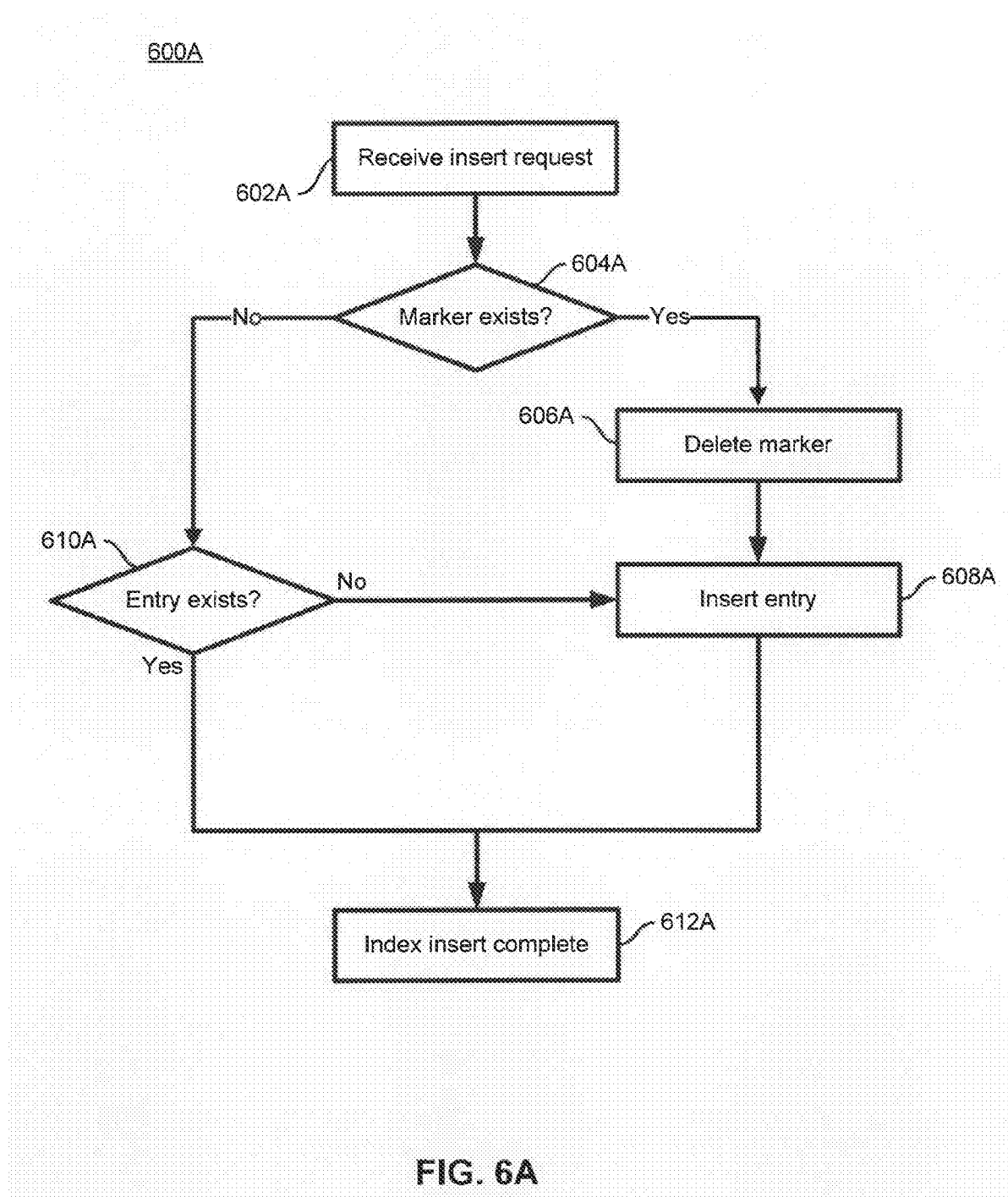
FIGS. 6A and 6B are flowcharts depicting methods of handling a modification of a table being indexed according to various embodiments.
Figure 6B:
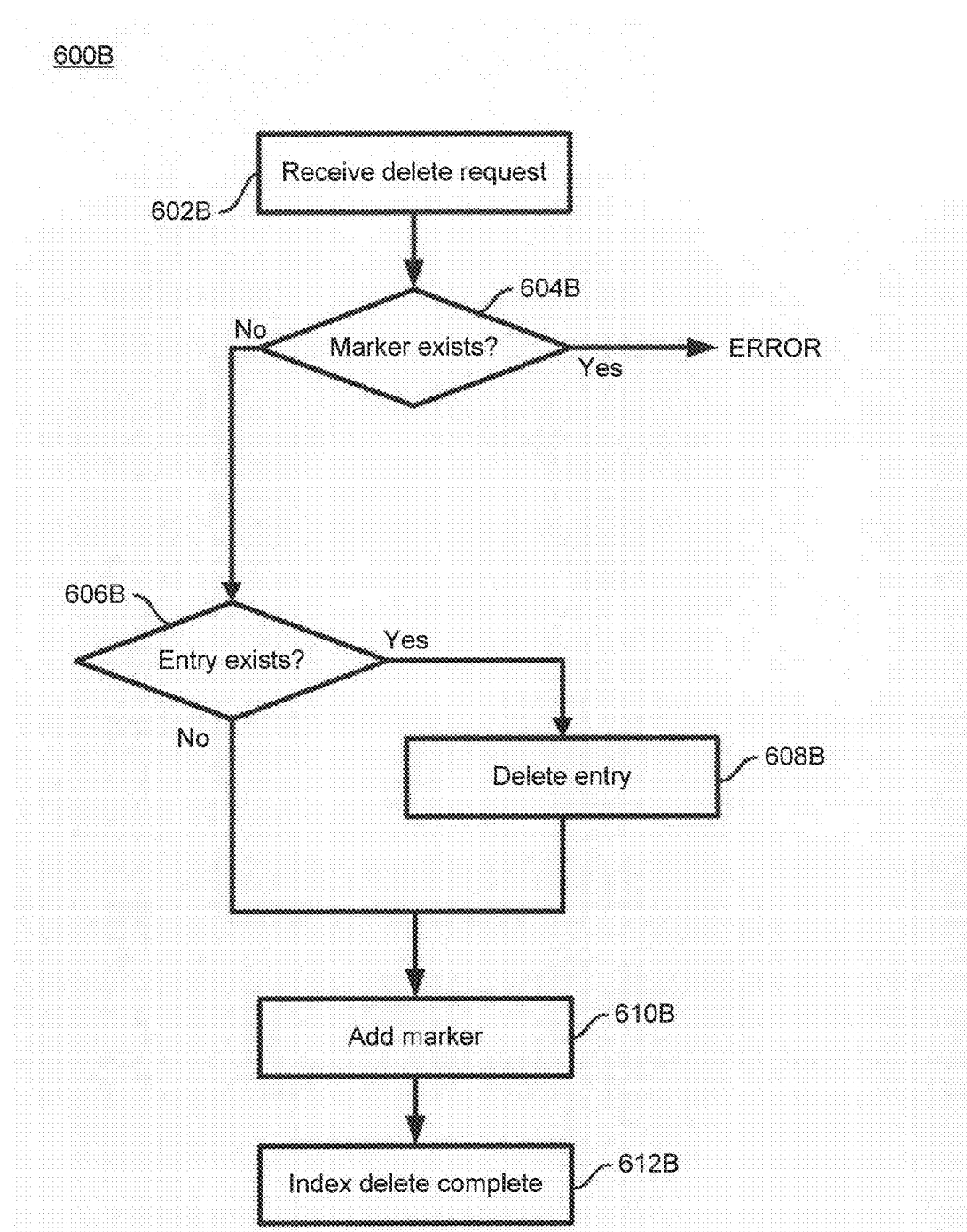

FIGS. 6A and 6B are flowcharts depicting methods 600A and 600B of handling a modification or modification request to table column 302 during the process of populating an index 306 with index entries 308 corresponding to table entries 304 from table column 302. In particular, FIG. 6A depicts method 600A of handling the instance when the table 302 is to be modified by an insertion and FIG. 6B depicts method 600B of handing the instance where the table 302 is to be modified by a deletion. For instance, according to some embodiments, processes 600A and B may be performed after step 508 of process 500 depicted in FIG. 5. As with the processes depicted by FIGS. 4 and 5, FIG. 6 will be described with respect to the table column 302 and index 306 depicted in FIGS. 3A-3F to aid explanation, however it should be understood that the process 600 is not limited to these particular embodiments.

Process 600A depicts the process of adding an appropriate entry 308 to index 306 when, e.g., a row is added to table 302. As noted previously, this can occur for portions of the index 306 that have yet to be populated with data from table 302. Process 600A may interrupt processes (such as the population process depicted in FIG. 5) or, alternatively, insertions (as well as deletions) to the table 302 can be periodically checked for and the process 600A invoked when necessary.

Process 600A begins at step 602A, when an insert request (e.g., modification request 314) with respect to table column 302 is received. At step 604A, the method 600A determines whether the index 306 corresponding to the insertion 314 contains a marker (i.e., an indication that a deletion has occurred in the table). If the index 306 does contain a corresponding marker, the marker is deleted at step 606A and the appropriate entry 308 is inserted into the index 306 at step 608A. For instance, appropriate index entry 2M $308_{2M}$ can be inserted into the index 306, as shown in FIG. 3D.

If, however, at step 604A, it is determined that a marker does not exist, then the method 600A will determine whether an associated entry exists at step 610A. If an associated entry does not exist, then the method can add an appropriate entry 308 at step 608A. If, on the other hand, an entry already exists for the entry to be inserted, then the method may proceed to step 612A, where the insertion into the index is complete.

Similarly to FIG. 6A, FIG. 6B depicts a process 600B for handling a modification to the table 302 in the index 306 while the index 306 is being populated with data. However, unlike FIG. 6A, the process 600B depicted in FIG. 6B is used when the modification is a deletion. As with process 600A, it is possible to invoke process 600B so that it interrupts the populating process (e.g., process 500) when a deletion is detected. Alternatively, it is also possible to periodically check for any deletions and invoke the process 600B when such deletions are detected according to various embodiments.

The process 600B begins at step 602B, when a delete request (e.g., modification request 314) with respect to table column 302 is received. At step 604B, the method 600B determines whether the index 306 corresponding to the insertion 314 contains a marker 312 (i.e., an indication that a deletion has occurred in the table). If the index 306 does contain a corresponding marker, an error is indicated and no operation is taken.

However, if it is determined at step 604B that a marker does not exist, then the process 600B determines whether an entry already exists at step 606B. If an entry 308 does exist at the place in the index 306 corresponding to the deletion, then that entry is deleted at step 608B and the process 600B proceeds to 610B. If there is no pre-existing entry in the entry at the index 306 location corresponding to the deletion (e.g., because that portion of the table 302 has not yet been indexed and/or populated), then the process 600B simply continues to step 610B.

At step 610B a marker 312 is inserted into the portion of the index 306 corresponding to the deletion from the table 302. The marker 312 indicates that the corresponding entry (e.g., row) in the table 302 is or will be deleted. At step 612B, the process for handling a deletion from the table 302 is complete with respect to the index 306. At this point, the process of populating the index (e.g., process 500) may be resumed according to various embodiments.

Example Computer System

Figure 7:
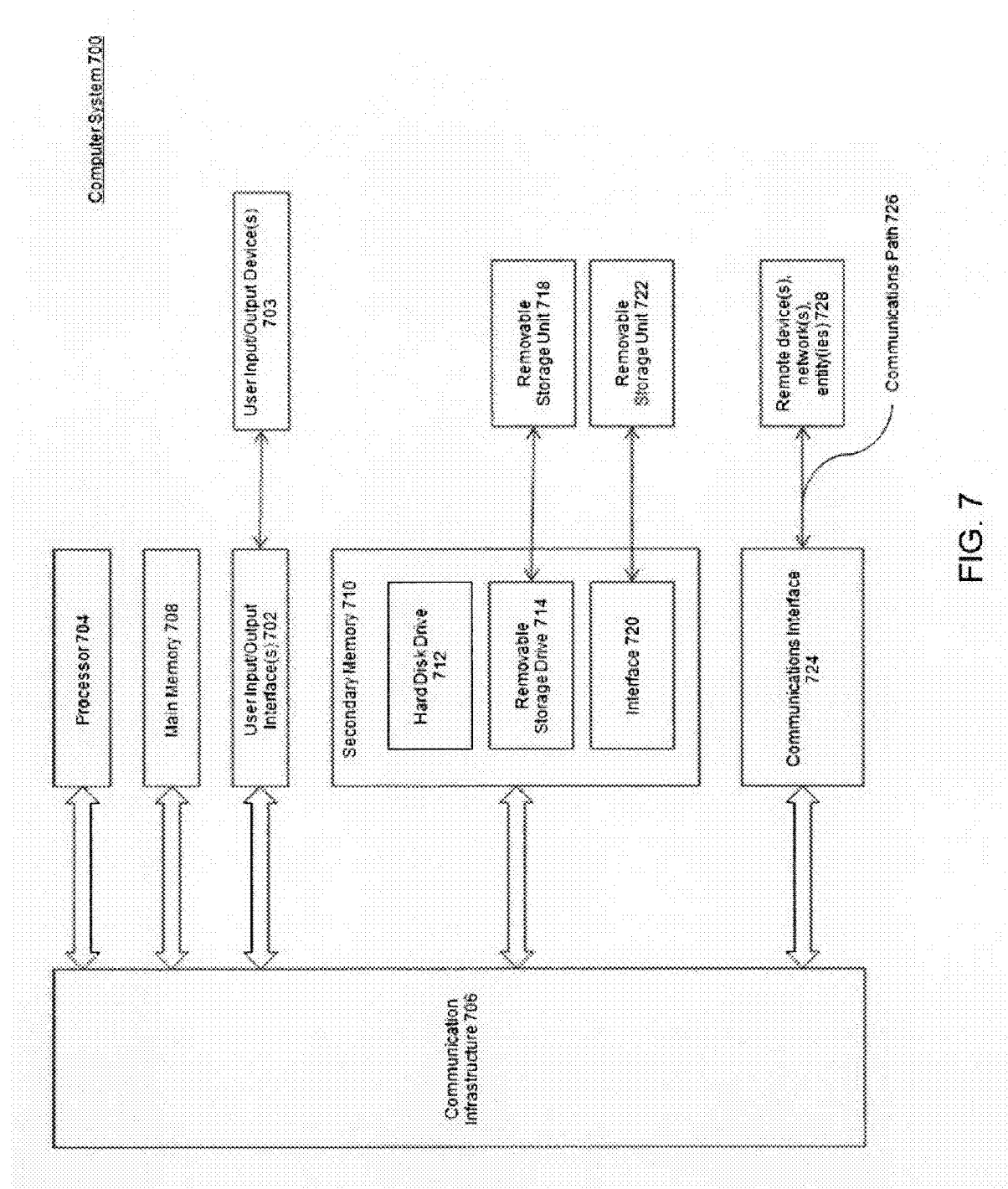
FIG. 7 is an example computer system useful for implementing various embodiments.

Various embodiments can be implemented, for example, using one or more well-known computer systems, such as computer system 700 shown in FIG. 7. Computer system 700 can be any well-known computer capable of performing the functions described herein, such as computers available from International Business Machines, Apple, Sun, HP, Dell, Sony, Toshiba, etc.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 700 also includes user input/output device(s) 703, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the contemplated embodiments using data processing devices, computer systems and/or computer architectures other than that shown in FIG. 7. In particular, embodiments may operate with software, hardware, and/or operating system implementations other than those described herein.

Example Database System

Figure 8:
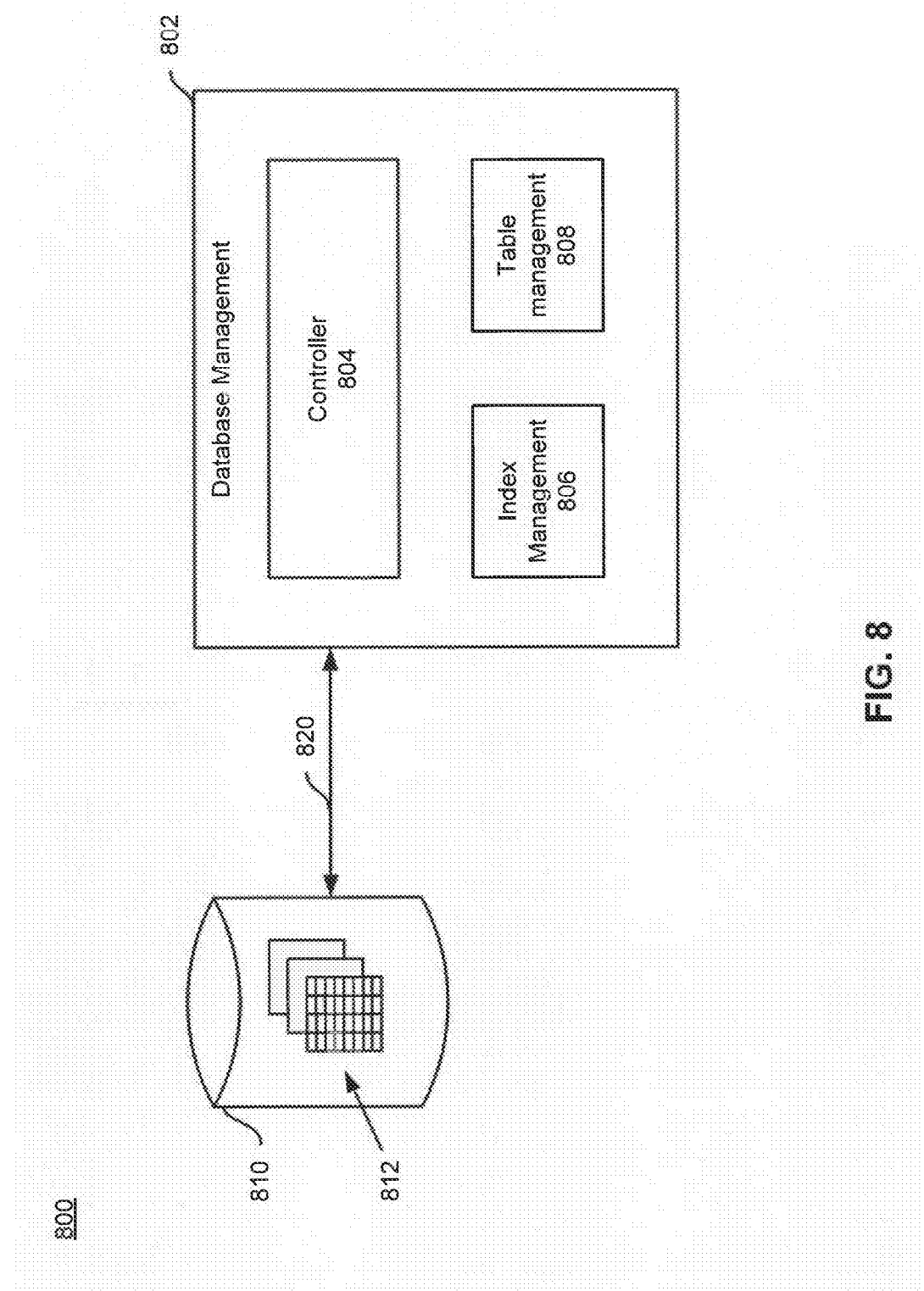
FIG. 8 is a functional block diagram depicting various elements of an example database system according to various embodiments.

FIG. 8 depicts an exemplary database system 800 according to various embodiments. The database system includes a database management entity 802 and a data store 810 in communication with each other via an electronic communication path 820. That database controller may include a controller 804, an index management module 806, and a table updater 808. The database management entity 802 may also comprise one or more processors and/or logic necessary for carrying out the functions of its various components. For instance, according to some embodiments, the database management entity may comprise one or more computer systems such as computer system 700. The controller 804 may be configured to control the various database systems. The index management module 806 may be configured to manage the various aspects of creating, populating, and updating, e.g., index 306 described above. Similarly, table management module 808 may be configured to manage the various aspects of the database tables described above. For instance, according to some embodiments, the table management module 808 may be configured to manage the addition and/or deletion of table rows to/from database tables 102.

Data store may comprise any appropriate computer readable medium and may contain one or more database table 812 according to various embodiments. The database tables 812 can be configured to be managed by the table management entity 808 via communication path 820.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments as contemplated by the inventor(s), and thus, are not intended to limit the scope of the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of invention should not be limited by any of the above-described exemplary embodiments, but should be defined only in accordance with the following claims and their equivalents.

What is claimed is:

1. A method of indexing database tables stored in a database system, the method comprising:
   partially populating an index with data from a database table;
   receiving a requested modification to the database table;
   determining that the requested modification corresponds to a portion of the index that has yet to be populated;
   temporarily suspending populating the index;
   inserting a marker in the portion of the index that has yet to be populated to indicate the requested modification, wherein the marker is inserted into a portion of the index that will contain an entry corresponding to the marker when it is populated; and
   populating a remaining portion of the index with data from the database table.

2. The method of claim 1, further comprising:
   receiving a second request to modify the database table;
   determining that the second request to modify the database table relates to a portion of the database table corresponding to a portion of the index that has already been populated; and
   updating the portion of the index that has already been populated with information relating to the second requested modification.

3. The method of claim 1, further comprising:
   temporarily locking the database table prior to populating the index with data from the database table.

4. The method of claim 1, wherein populating the index with data from the database table comprises:
   identifying a portion of the database table yet to be indexed; and
   determining whether a corresponding entry for the identified portion of the database table to be indexed already exists in the index.

5. The method of claim 4, further comprising:
performing no operation on the index corresponding to the identified portion of the database table when it is determined that a corresponding entry exists in the index.

6. The method of claim 4, further comprising:
deleting, in response to determining that a corresponding entry already exists in the index, the corresponding entry from the index.

7. The method of claim 1, wherein the modification comprises deleting a row from the database table.

8. The method of claim 7, wherein the inserted entry comprises an indication that the row of the database table is to be deleted.

9. The method of claim 1, wherein the modification comprises adding a row to the database table.

10. The method of claim 9, wherein the entry comprises indexing information for the added row of the database table.

11. A database system, comprising:
a data storage comprising a database table; and
a database management entity configured to:
partially populate an index with data from the database table;
receive a requested modification to the database table;
determine that the requested modification corresponds to a portion of the index that has yet to be populated;
temporarily suspend populating the index;
insert a marker in the portion of the index that has yet to be populated to indicate the requested modification, wherein the marker is inserted into a portion of the index that will contain an entry corresponding to the marker when it is populated; and
populate a remaining portion of the index with data from the database table.

12. The system of claim 11, wherein the database management entity is further configured to:
receive a second request to modify the database table;
determine that the second request to modify the database table relates to a portion of the database table corresponding to a portion of the index that has already been populated; and
update the portion of the index that has already been populated with information relating to the second requested modification.

13. The system of claim 11, wherein the database management entity is further configured to:
temporarily lock the database table prior to populating the index with data from the database table.

14. The system of claim 11, wherein the database management entity is configured to populate by:
identifying a portion of the database table to be indexed; and
determining whether a corresponding entry for the identified portion of the database table to be indexed already exists in the index.

15. The system of claim 14, wherein the database management entity is configured to perform no operation on the index corresponding to the identified portion of the database table when it is determined that a corresponding entry exists in the index.

16. The system of claim 14, wherein the database management entity is configured to add data to the index that corresponds to the identified portion of the database table when it is determined that no corresponding entry exists in the index.

17. The system of claim 11, wherein the modification comprises deleting a row from the database table.

18. The system of claim 17, wherein the database entity is configured to insert an entry that comprises an indication that the row of the database table is to be deleted.

19. The system of claim 11, wherein the modification comprises adding a row to the database table.

20. The system of claim 19, wherein the database management entity is configured to insert an entry that comprises indexing information for the added row of the database table.

21. A non-transitory computer readable medium containing instructions that, when executed by a computer, cause the computer to perform process steps, comprising:
partially populating an index with data from a database table;
receiving a requested modification to the database table;
determining that the requested modification corresponds to a portion of the index that has yet to be populated;
temporarily suspending populating the index;
inserting a marker in the portion of the index that has yet to be populated to indicate the requested modification, wherein the marker is inserted into a portion of the index that will contain an entry corresponding to the marker when it is populated; and
populating a remaining portion of the index with data from the database table.

22. The method of claim 1, further comprising;
temporarily locking the database table after populating the remaining portion of the index; and
resolving one or more uncommitted operations.

23. A method of indexing database tables stored in a database system, the method, comprising:
partially populating an index with data from a database table;
receiving a requested modification to the database table;
determining that the requested modification corresponds to a portion of the index that has yet to be populated;
inserting an entry in the portion of the index that has yet to be populated to indicate the requested modification;
receiving a second request to modify the database table;
determining that the second request to modify the database table relates to a portion of the database table corresponding to a portion of the index that has already been populated; and
updating the portion of the index that has already been populated with information relating to the second requested modification; and
populating a remaining portion of the index with data from the database table.

* * * * *